Oct. 20, 1936.   R. F. DOLLASE   2,058,140
PLOW
Filed Nov. 2, 1935
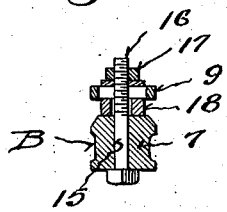
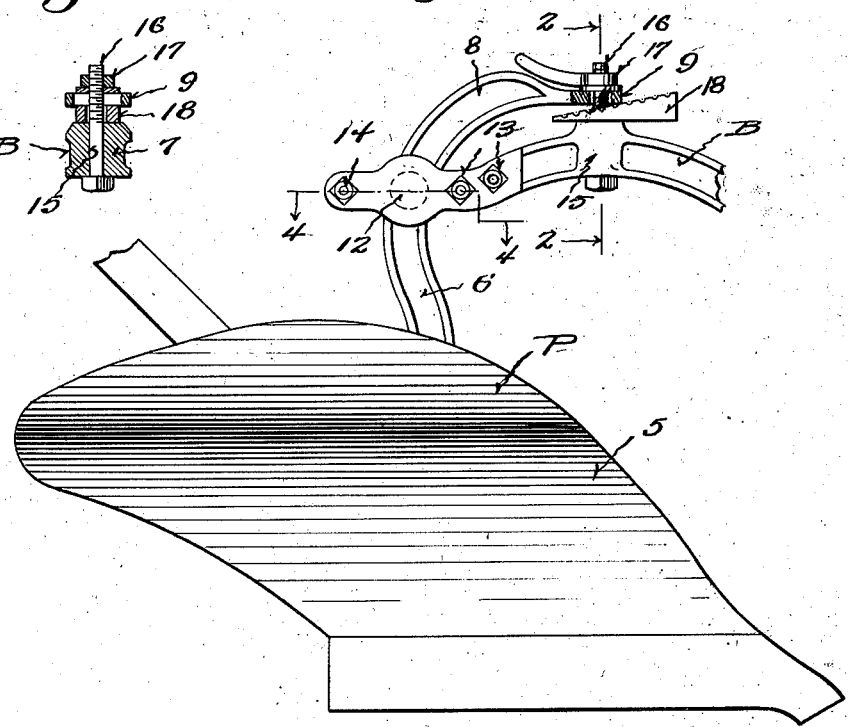
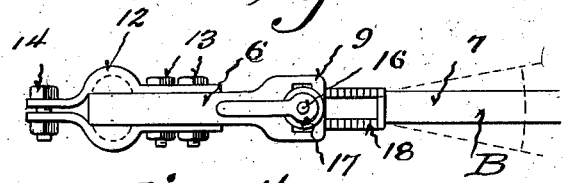
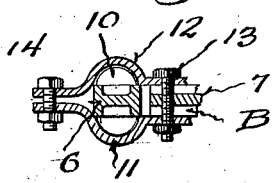
Inventor
Robert F. Dollase
By Attorneys Patented Oct. 20, 1936

2,058,140

UNITED STATES PATENT OFFICE 2,058,140

PLOW

Robert F. Dollase, Fort Atkinson, Wis., assignor of one-half to Gustav Hanson, Fort Atkinson, Wis.

Application November 2, 1935, Serial No. 48,017

2 Claims. (Cl. 97—186)

This invention appertains to farming implements, and more particularly to an adjustable plow.

In plowing, farmers have considerable difficulty when the plow beam becomes sprung or bent. Generally, this necessitates the stopping of the plowing and the transporting of the plow to a blacksmith for the straightening of the beam.

One of the primary objects of my invention is to provide an adjustable beam for the plow, whereby the beam can be shifted laterally to compensate for a bend in the beam, the device being of such a construction and arrangement that the adjustment can be made in the field without interrupting the plowing operation.

Another salient object of my invention is the provision of a plow beam which can be adjusted both in a vertical and a horizontal plane, whereby the beam can be shifted to take care of a bend in the beam and to regulate the depth of plowing.

A further important object of my invention is the provision of a sectional plow beam, the plow foot portion of which is connected to the plow bottom in the usual manner, and which has formed thereon a ball for reception in a socket carried by the main plow beam section, with means interposed between the foot section and the main section for facilitating the adjustment between said sections.

A still further object of my invention is to provide an improved plow of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed, and illustrated in the accompanying drawing, in which drawing:

Figure 1 is a fragmentary side elevation of a plow constructed in accordance with my invention, parts of the figure being shown broken away and in section.

Figure 2 is a detail transverse section through the plow beam, taken on the line 2—2 of Figure 1.

Figure 3 is a fragmentary top plan view of my novel plow beam.

Figure 4 is a detail horizontal section through the universal joint connection of the plow beam sections, the view being taken substantially on the line 4—4 of Figure 1.

Referring to the drawing in detail, wherein similar reference characters designate corresponding parts throughout the several views, the letter P generally indicates my improved plow, which embodies my novel plow beam B. The plow bottom 5 can be of any preferred or desired character and is connected to the beam in any conventional manner.

In accordance with my invention, the plow beam B is formed in sections, namely, the rear stationary beam or foot section 6 and the main or tilting section 7.

The stationary or foot section 6 curves forwardly over the plow bottom, as at 8, and has formed on its forward end the horizontally disposed eye or apertured collar 9. The vertical portion of the plow beam section 6 has formed thereon on opposite sides thereof semi-spherical knobs 10, which form a part of a ball-and-socket joint, as will be later set forth.

The main or tilting plow beam section 7 has its rear end extended under the collar 9 of the stationary beam section 8, and has formed thereon or secured thereto a socket 11 for receiving the semi-spherical knobs 10. This socket 11 may include side plates 12 bolted, as at 13, to the tilting beam section 7, and the rear ends of the plates 12 can be bolted together, as at 14. By this arrangement, the plow beam section 7 can be tilted in any desired direction.

Directly below the slotted collar or head 9, the beam section 7 is formed with a sleeve 15 for receiving a bolt 16, which is adapted to extend through the aperture or slot in the collar or head 9. A winged or tailed nut 17 can be threaded on the bolt 16 for firmly connecting the plow beam sections together.

I prefer to interpose a wedge 18 between the collar or head 9 and the sleeve 15. By this arrangement, when the nut 17 is loosened, the wedge 18 can be moved back and forth to swing the main beam section 7 in a vertical plane and thereby regulate the depth of plowing. Obviously, the beam section 7 can also be shifted laterally in the desired direction to compensate for a bend in a plow beam, so that the plow bottom can be placed in the proper alinement.

From the foregoing description it can be seen that I have provided an exceptionally simple arrangement of plow beam, which will permit the adjustment thereof in any desired direction.

Changes in details may be made without departing from the spirit or the scope of my invention, but what I claim as new is:

1. In a plow, a plow beam comprising a stationary rear section and a front tilting section, a universal joint connection between the rear end of the front beam section and the stationary beam section, a slotted head formed on the forward end of the stationary beam section, a bolt extending through the front beam section intermediate its ends and the slotted head, an adjusting nut on said bolt for engaging said head, and a wedge interposed between the head and the front plow beam section.

2. In a plow, a plow beam comprising a stationary rear section and a front tilting section, a universal joint connection between the rear end of the front beam section and an intermediate portion of the stationary rear beam section, whereby the front beam section can be swung both in a horizontal and a vertical plane, and means for rigidly clamping an intermediate portion of the front beam section to the forward end of the stationary rear beam section.

ROBERT F. DOLLASE.